J. A. SHARPS.
SAW SET.
APPLICATION FILED JUNE 6, 1914.
1,125,406.
Patented Jan. 19, 1915.
2 SHEETS—SHEET 1.
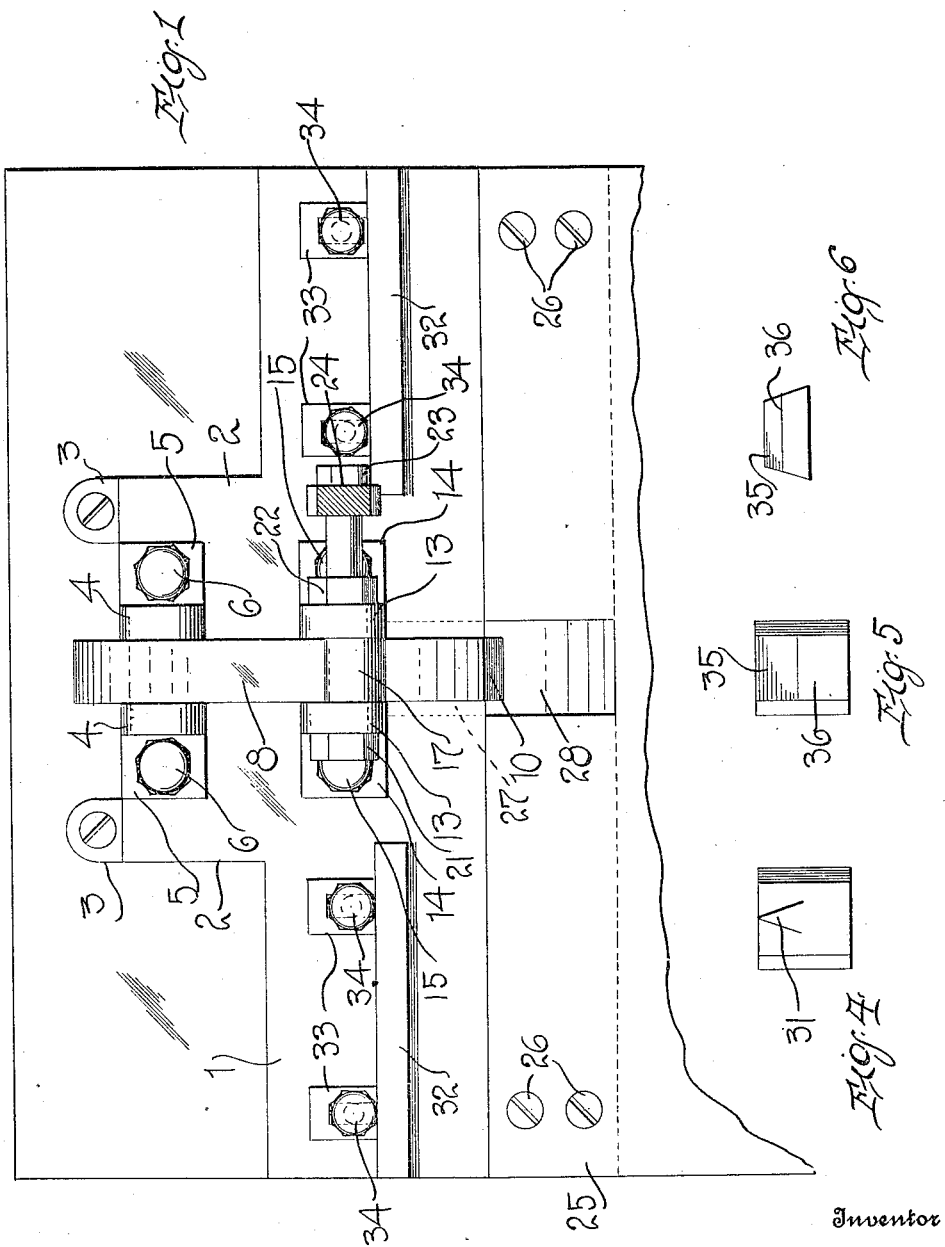
Witnesses
Robert M. Sutphen
A. J. Hind
Inventor
J. A. SHARPS
By Watson E. Coleman
Attorney

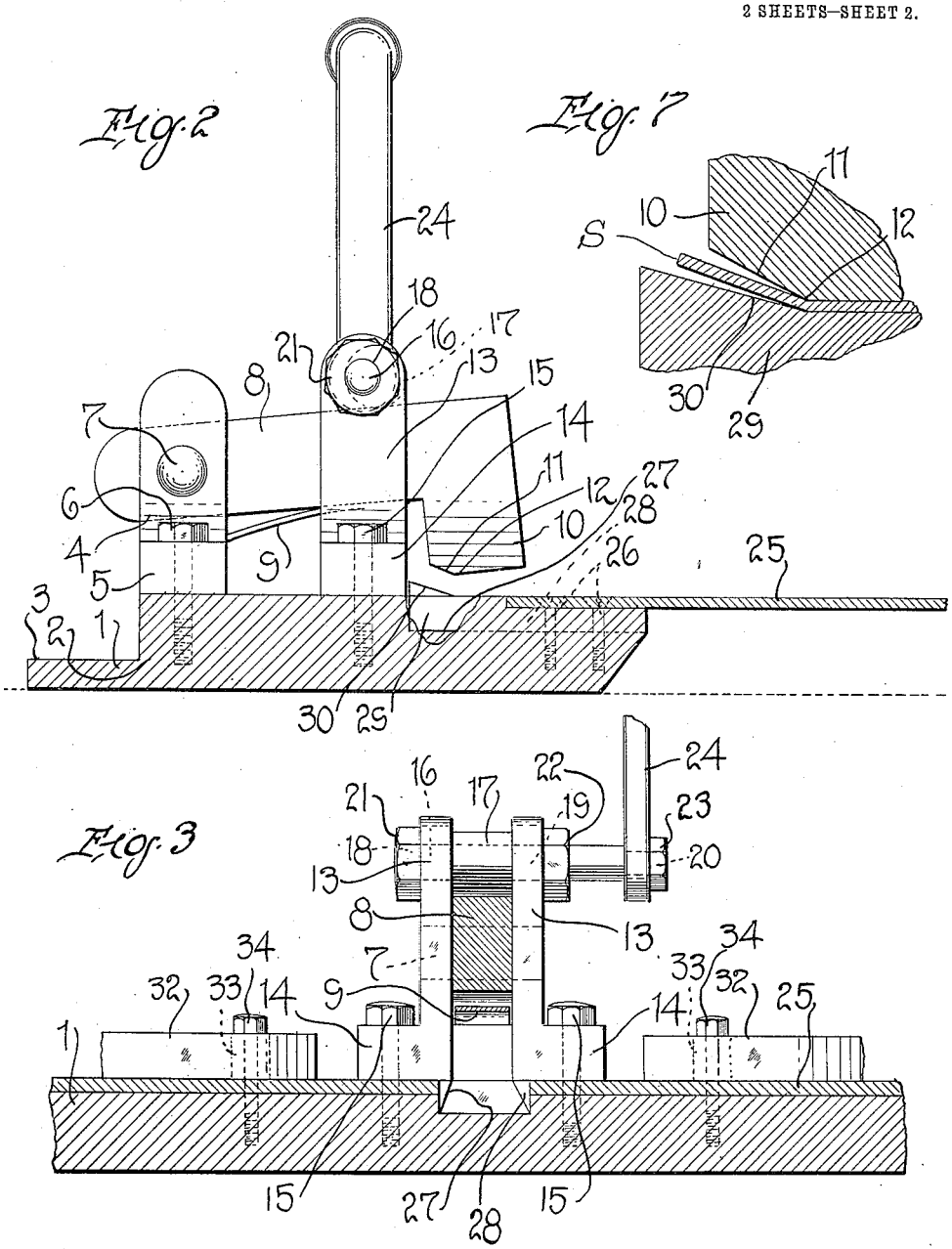

UNITED STATES PATENT OFFICE.

JOHN A. SHARPS, OF BABLIN, WEST VIRGINIA.

SAW-SET.

1,125,406.   Specification of Letters Patent.   Patented Jan. 19, 1915.

Application filed June 6, 1914. Serial No. 843,499.

*To all whom it may concern:*

Be it known that I, JOHN A. SHARPS, a citizen of the United States, residing at Bablin, in the county of Lewis and State of West Virginia, have invented certain new and useful Improvements in Saw-Sets, of which the following is a specification, reference being had to the accompanying drawings.

This invention relates to saw sets.

The object of the invention is to provide an article of this character, which shall be exceedingly simple of construction, of the highest efficiency and durability in use, and certain of operation, and in the employment of which, and without the requirement of expert skill for the purpose, the operator may impart the proper set or slant to the saw teeth, and in a perfectly uniform manner throughout, whereby to insure the highest efficiency in the operation of the saw, with the reduction of labor attending the use of the same to the minimum.

With the above and other objects in view, as will appear as the nature of the invention is better understood, the same consists, generally stated, in a saw set embodying a base plate with which are combined two pairs of spaced standards, one pair of which has pivotally connected with it a punch, and the other pair a lever, the shaft of which is provided with an eccentric to coact with the punch and cause it to be forced downward toward the base plate. Combined with the base plate is a swage, and the opposed faces of the punch and the swage are inclined in the same direction but on different angles, the difference in angularity corresponding to the proper slant to be imparted to a saw tooth, whereby in the use of the article, perfect regularity in the setting of the teeth will be secured. Combined with the base plate is a table upon which the saw will rest while being operated upon, and coacting with the swage, are a pair of gages or guides, which are disposed on each side of the swage and are designed to regulate the disposition of the teeth upon the swage, whereby either large or small teeth may be set with equal facility and ease. The swage is arranged to be removed from the base plate so as to permit changing of the character of the swage to adapt the implement for swaging either hand saw teeth of any size, or cross cut saw teeth.

Further and more specific details of construction will be hereinafter fully described and claimed.

In the accompanying drawings forming a part of this specification, and in which like characters of reference designate corresponding parts: Figure 1 is a top plan view of a saw set constructed in accordance with the invention, parts being shown as in section; Fig. 2 is a view in side elevation, partly in section; Fig. 3 is a front view partly in section; Figs. 4, 5 and 6 are detail views of different forms of swages that may be employed; Fig. 7 is a fragmentary detail view in section showing the manner in which the set operates to slant a saw tooth.

Referring to the drawings, 1 designates the base or bed plate, which is provided, at its center, with a rearwardly projecting extension 2 carrying two perforated lugs or ears 3 designed to receive screws or bolts by which the base plate may be firmly secured to a suitable support. Disposed on the extension 2 adjacent to its rear edge is a pair of spaced standards 4, each of which carries a foot 5, and these two feet are held assembled with the base plate by bolts 6. The upper ends of the standards are provided with alined orifices that are designed to be engaged by a pin or bolt 7 that passes through the rear end of the shank 8 of a punch, a leaf spring 9 secured at its rear end to the extension between the standards, and bearing against the under side of the shank 8, serving to hold the punch normally raised. The punch 10 is disposed at approximately right angles to the shank, and has its rear inner edge 11 inclined at an angle to the longitudinal axis of the shank and shaped to present a swage face 12 of apexiform contour as clearly shown in Fig. 4, the apex of which is projected toward the front of the base plate, thus to contact squarely with the saw teeth to be set.

Secured to the base plate at a point intermediate of its width are two additional standards 13, the lower end of each of which is provided with a foot 14, and these two feet are orificed to receive bolts 15 by which the standards are secured to the base plate. The upper end of each of the standards is provided with an orifice, the two orifices being in alinement and designed to be engaged by a shaft 16 carrying intermediate of its ends an eccentric 17 that is designed to engage with the upper face of the shank 8, the latter being projected between the standards 13 for this purpose. The shaft 16 is provided at each end and intermediate of its ends with threaded portion 18, 19 and 20, the threaded portions 18 and 19 being engaged by nuts 21 and 22 that are disposed exteriorly of the standards 13, and thereby positively hold the shaft against any lateral movement relative thereto, and the threaded portion 20 is engaged by a nut 23 that serves to hold assembled with one end of the shaft an operating lever 24, that portion of the shaft engaged by the lever being square, and the opening in the lever being of like contour, so that positive operation of the shaft may be secured.

Combined with the upper side of the front portion of the base is a table 25 that is inset in the top of the bed plate so as to lie flush with the upper face thereof, and which is held assembled therewith by screws 26. The front wall of the bed plate from the outer sides of the feet 14 to the edge of the table is provided with a dove-tailed slot or guide 27, and the table 25 is provided with a slot 28 forming a continuation of the slot 27, but wider, and the guide is engaged by a stake or anvil 29 that is positioned by being inserted through the slot 28 and thence pushed into the guide until its inner end abuts with the like wall of the guide. The upper face of the stake is provided with a swaging face 30 which is designed to be complemental to the under face of the punch, and these two faces are oppositely inclined or beveled on different angles, whereby in the use of the apparatus, to insure the proper set or slant to the teeth.

Where this implement is to be used in setting the teeth of a hand saw, the form of swaging face shown in Fig. 4, will be employed, this face 31 being of triangular contour with its apex disposed toward the rear edge of the base plate, and the swaging face of the punch will be of like contour with its apex projected in the same direction. It is designed that these two swage faces shall be of a size to be effective in bending the teeth of hand saws from the smallest to the largest size, and to secure this result, two gages 32 are provided, which are disposed on each side of the standards 13, and each is provided with two rearwardly projected slotted arms 33 that are designed to receive set screws 34 that are secured in the bed plate, and serve positively to hold the gages in the proper adjustment so that the swage faces of the stake and the punch will operate with exactness upon the teeth to be swaged.

Where the implement is to be used in setting the teeth of a cross cut saw, the swage face of the punch will be angularly disposed but flat, and the swage face 35 of the stake 36 will also be angularly disposed and flat, the difference in angularity between the two faces being maintained for the reason above pointed out.

From the foregoing description it will be seen that while the improvements herein described are simple in character, they will be thoroughly efficient for the purposes designed, and will coact in the production of a saw set that may easily be employed when setting the teeth of any kind of a saw.

I claim:

A saw set comprising a base provided at its front edge with a groove, a table secured to the base and having a slot communicating with the groove, a block disposed within the groove and having its upper face flush with the upper face of the base, said block having a raised swage face at its inner end extending above the upper face of the base, a punch pivotally supported upon the base and having a swaging face to coact with the swage face of said block, and means for actuating the punch.

In testimony whereof I hereunto affix my signature in the presence of two witnesses.

JOHN A. SHARPS.

Witnesses:
  C. M. WEAVER,
  J. E. VASSAR.

Copies of this patent may be obtained for five cents each, by addressing the "Commissioner of Patents, Washington, D. C."